United States Patent [19]

Islas

[11] Patent Number: 4,898,041

[45] Date of Patent: Feb. 6, 1990

[54] DRIVE LINKAGE FOR RECIPROCATING ENGINE

[76] Inventor: John J. Islas, R.D. 3, Box 498, Canastota, N.Y. 13032

[21] Appl. No.: 45,539

[22] Filed: May 4, 1987

[51] Int. Cl.$^4$ .......................................... F16H 21/38
[52] U.S. Cl. .................................. 74/44; 123/197 AC
[58] Field of Search ...................... 74/44; 123/197 AC

[56] References Cited

U.S. PATENT DOCUMENTS

| | | | |
|---|---|---|---|
| 1,527,296 | 2/1925 | Dudas | 74/44 |
| 1,585,796 | 5/1926 | Stahlberger | 74/44 |
| 1,701,439 | 2/1929 | Canfield | 74/44 |
| 1,755,942 | 4/1930 | Woolson | 123/197 AC |
| 1,857,352 | 5/1932 | Cannon | 74/44 |
| 2,229,788 | 1/1941 | Appleton | 74/51 |
| 2,392,921 | 1/1946 | Holman | 74/44 |
| 2,417,910 | 3/1947 | Bruegger | 74/44 |
| 2,963,854 | 12/1960 | Meijer | 74/44 |
| 3,059,418 | 10/1962 | Johnston | 74/44 |
| 3,680,396 | 8/1972 | Healy | 74/44 |

Primary Examiner—Leslie A. Braun
Assistant Examiner—Scott Anchell
Attorney, Agent, or Firm—Wall and Roehrig

[57] ABSTRACT

A reciprocating engine has a cylinder with a piston that travels between top dead center and bottom dead center, and a pair of parallel counter-rotating cranks that are joined by respective connecting rods to a piston rod that passes through the plane defined by the axes of the cranks. This construction permits the rotary motion of the cranks to exceed 180° during either the compression or the power stroke of the piston and to be correspondingly less than 180° for the other. To avoid having bending or buckling forces applied to the connecting rods, the piston rod is sufficiently long that the couplings of the piston rod and the connecting rods remain disposed to the side of the plane of the cranks that is remote from the piston for all travel of the piston between top dead center and bottom dead center positions. The mechanical advantage as between power and compression strokes can exceed 2:1, yielding a favorable mechanical advantage for the expanding combustion gas in the cylinder chamber.

9 Claims, 3 Drawing Sheets

DRIVE LINKAGE FOR RECIPROCATING ENGINE

BACKGROUND OF THE INVENTION

This invention relates to reciprocating engines such as gasoline or diesel internal combustion engines, as well as to Stirling or other external combustion engine. The term engine as used herein is not limited only to prime movers or power sources, but can also be applied to other reciprocating devices such as piston type pumps and compressors.

In a typical reciprocating engine, a piston oscillates within a cylinder, and defines within the cylinder a chamber of variable volume. This chamber has minimum and maximum volumes, respectively, at piston positions corresponding to top dead center, (where the piston is closest to the cylinder head), and to bottom dead center, (where the piston is closest to the crank or other drive linkage).

In a conventional internal combustion engine, a combustion or power stroke normally occurs as the phase of the cycle in which the piston travels from top dead center to bottom dead center. Conversely, a compression stroke occurs on the phase in which the piston travels from bottom dead center to top dead center. In an internal combustion engine, the maximum forces occurring on the power stroke far exceed the maximum forces sustained on the compression stroke. In order to provide more stable and smoother operation, and to reduce internal forces on the drive linkages, it is desirable for the power stroke to occupy other than 180° of crank travel. This would also provide a greater mechanical advantage to the expanding gas within the chamber because of the optimization of rotation angle to the power stroke.

There have been several previous attempts to alter the power stroke by employing toggle linkage systems that connect a piston to a pair of parallel, counter-rotating cranks. Two such systems are described, for example, in U.S. Pat. Nos. 1,585,796 of May 25, 1926, and 2,392,921, of Jan. 15, 1946.

In these previous patented systems, the piston reciprocates on a line perpendicular to a plane defined by the axes of the two cranks. The length of the connecting rods that connect the piston to the crank is proportioned, with respect to the length of the crank and the distance between the two crank shafts, so that the angle between the connecting rods is less than 90° when the piston is at bottom dead center.

While these previous attempts were able to change the crankshaft rotational angle that corresponded to a power stroke, these particular twin-crank drive mechanisms have not proved to be entirely practicable. One reason for this is that there is a high compressive force on the drive linkage, that is, the piston pushes against the connecting rod. The highly elevated compressive forces, especially after combustion on the power stroke, tend to buckle or break the connecting rods, and can also cause heavy wear on the wrist pins where the connecting rods are journalled to the cranks.

OBJECTS AND SUMMARY OF THE INVENTION

It is an object of this invention to provide a drive linkage for a reciprocating engine which avoids the drawbacks of the prior art.

It is a more particular object of this invention to provide a linkage that converts the reciprocatory motion of a piston to a rotary motion in such a manner that the rotary motion that corresponds to the travel of the piston from the top dead center to the bottom dead center position is significantly different from 180°, and the rotary motion corresponding to travel of the piston from bottom dead center to the top dead center position is correspondingly different from 180° in the complementary sense.

It is a more specific object to provide such a drive linkage in which a tension force is maintained on the connecting rods that join the piston to the cranks, so that wear and buckling problems are avoided on the connecting rods and on the journals of the connecting rods and cranks are kept to a minimum.

Another object of the present invention is to reduce the dwell time in an internal combustion engine to gain optimum mechanical advantage from the fuel at the time when it has its greatest potential so that the energy of combustion can be fully utilized before dissipation.

According to an aspect of this invention, a reciprocating engine has a piston that travels in a cylinder between top dead center and bottom dead center positions, and has a pair of parallel counter rotating cranks that are joined by respective connecting rods to the piston, with parallel axes that define a crank plane. The rotary motion of the cranks for travel of the piston from top dead center to bottom dead center is significantly different from 180°, and the rotary motion of the cranks for piston travel from bottom dead center back to top dead center is correspondingly different from 180° in the complementary or opposite sense. This engine is improved insofar as it comprises a piston rod that extends from the piston and between the crank axes, and is journalled to the connecting rods such that the pivotal couplings of the piston rod and the connecting rods remain disposed to the side of the crank plane remote from the piston for all travel of the piston between its top dead center and bottom dead center positions. As a result of this construction, the piston transmits, through the piston rod, a pulling or tensive force to the connecting rods under all phases of high force loading. It is only during a portion of the intake phase that there is a compressive force on the connecting rods, but this force is quite small compared to the forces sustained on the compression and power phases. Because of the symmetrical nature of the twin crank system, the compressive force on the piston rod is always disposed along its length, so there is no torsional or buckling moment on the rod itself. This type of system is much more robust and durable than the earlier constructions, as described in the above-mentioned U.S. patents. The connecting rods will not reach a snap-over position that occurs in similar devices of the prior art.

The reciprocating engine according to this invention permits the drive cycle to be tailored for optimum use of the combustion of fuel in the cylinder. In an internal combustion engine, the fuel-air mixture tends to detonate, and discharge its total energy over the length of the power stroke. To avail of this energy, the dwell time at top dead center must be kept small. The mechanical advantage of the piston to the crank should be adjusted so as to move faster, but at a relatively constant high speed, during the power stroke, and at a slower speed during the remainder of the cycle. With the reciprocating engine of this invention, it is possible to achieve twice the mechanical advantage that is possible over a conventional single-crank system.

In this engine, for a given rotation angle of the twin cranks near top dead center, the piston will descend from top dead center substantially at least twice as far as said piston ascends toward top dead center over the same angle. This significantly reduces dwell at top dead center.

Connecting rods do not attain a snap over position, as occurs in the similar devices of the prior art.

The above and many other objects, features, and advantages of this invention will be more fully understood from the ensuing description of a preferred embodiment, which should be considered in connection with the accompanying drawing.

DETAILED DESCRIPTION OF A PREFERRED EMBODIMENT

Figure 1:
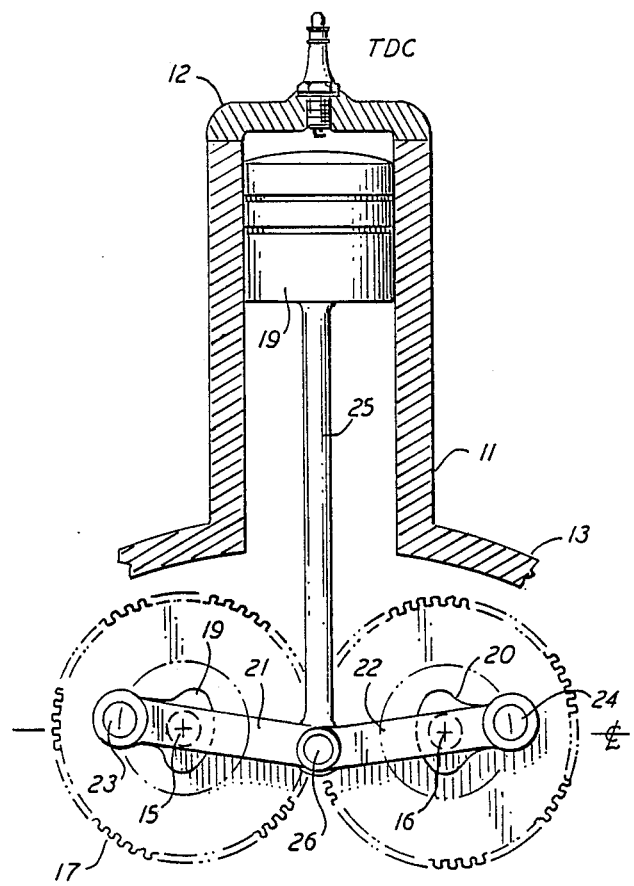
FIGS. 1 and 2 are sectional elevations of a reciprocating internal combustion engine that incorporates the principles of this invention, here illustrating top dead center and bottom dead center positions, respectively.
Figure 2:
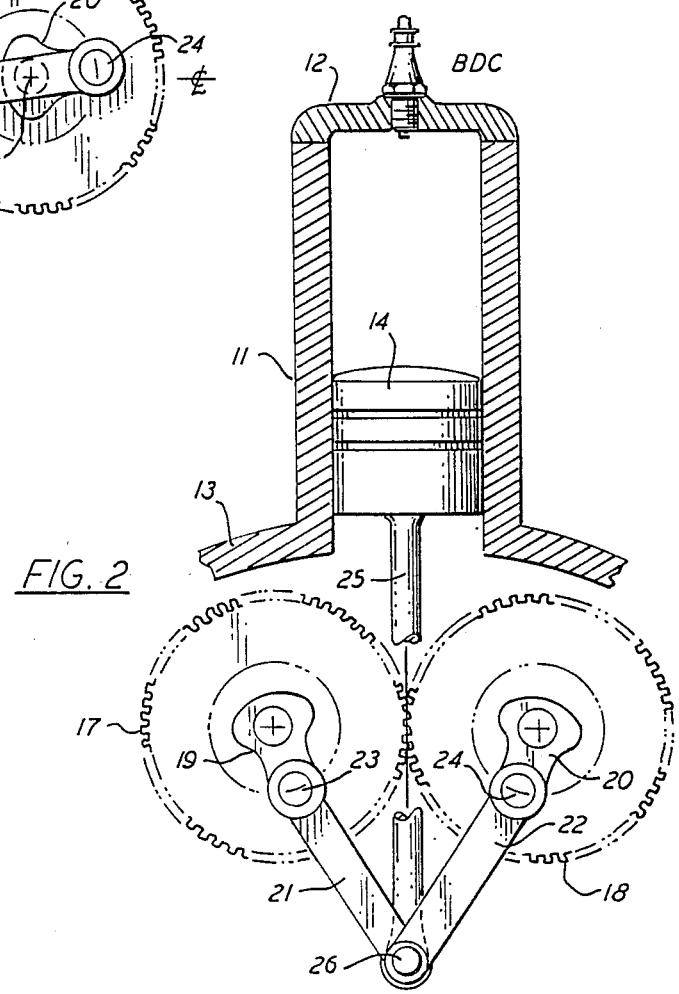

With reference initially to FIGS. 1 and 2 of the drawing, a preferred embodiment of this invention is shown as an internal combustion engine 10, which can be gasoline or diesel, and which can be of two-stroke or four-stroke operation. The engine 10 has a cylinder 11 having a head 12 at its upper end, and a crank case 13 at its lower end. A piston 14 reciprocates vertically in the cylinder between a top dead center position (FIG. 1) and a bottom dead center position (FIG. 2). In this engine 10 there is a left crank 15 and a right crank 16, which have parallel rotary axes that define a horizontal plane through the center line of the cranks 15 and 16. A pair of spur gears 17 and 18 connected with these cranks 15 and 16 are of the same diameter with the same number of teeth, causing the cranks 15 and 16 to rotate at the same speed but in opposite directions. A crank arm 19 and a crank arm 20 of the respective cranks 15 and 16 are joined to respective connecting rods 21 and 22 by means of journals 23 and 24. The engine has a vertical piston rod 25 that extends from the piston 14 downward and through the crank plane. A distal or lower end of the piston rod 25 is joined by means of a pivot pin or wrist pin 26 to an end of each of the connecting rods 21 and 22.

As shown in FIG. 1, even at the highest position of the piston 14 the pivot pin 26 is positioned on the side of the crank axes that is remote from the piston 14. This means that during the entire power stroke, as well as during the entire compression stroke of the engine, the cranks 15,16 and the piston rod 25 exert pulling forces on the connecting rods 21 and 22. Consequently, there is no tendency for these connecting rods 21 and 22 to bend or buckle, and, additionally, wear on the journals 23 and 24 and on the wrist pin 26 is kept to a minimum.

Figure 3:
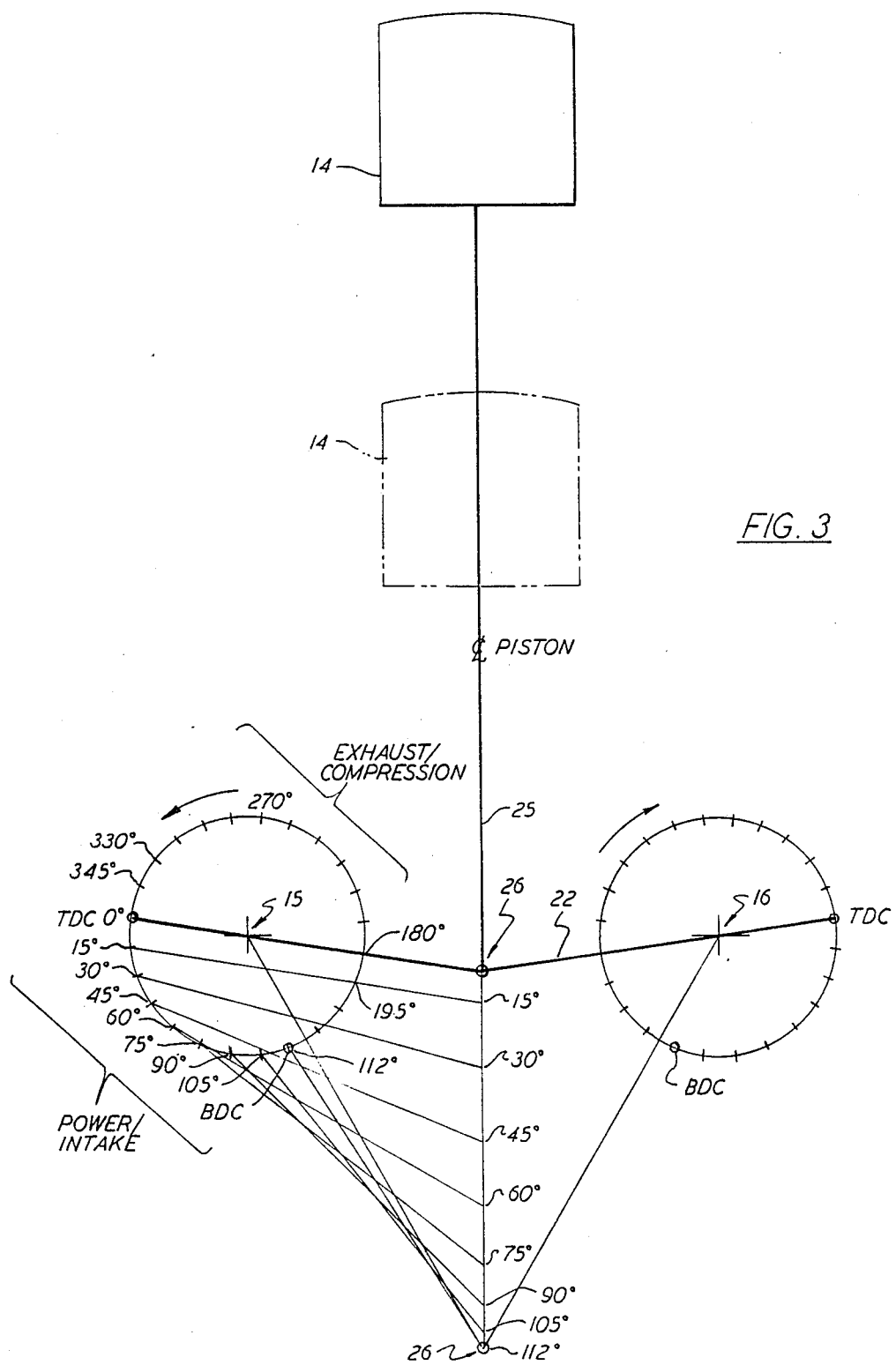
FIG. 3 is a chart for schematically illustrating the operation of the engine of this invention.

FIG. 3 illustrates graphically one up-and-down cycle (i.e. a compression stroke and a power stroke), of the engine 10 of this invention. At the beginning of the compression stroke, the piston 14 lies at bottom dead center, as shown in chain line in FIG. 3, and the cranks 15 and 16 are at the bottom dead center position, BDC.

In this particular illustrative arrangement, the rotation takes place on the inner part of the crank circles, and the rotation extends from bottom dead center BDC to a top dead center position TDC. This is a crank angle of about 230°. The following power stroke, which commences when the piston 14 reaches the position shown in solid line in FIG. 3, starts at zero degrees top dead center TDC, and continues about 130° to bottom dead center BDC. In this embodiment of the present invention, the crank travel corresponding to a power stroke is significantly less than 180°, and the crank travel corresponding to the compression stroke correspondingly exceeds 180°. The geometry of the crank arms 19,20, the connecting rods 21,22, and the horizontal separation between the cranks 15,16 can be tailored to achieve the optimum mechanical advantage for any particular engine.

Figure 4:
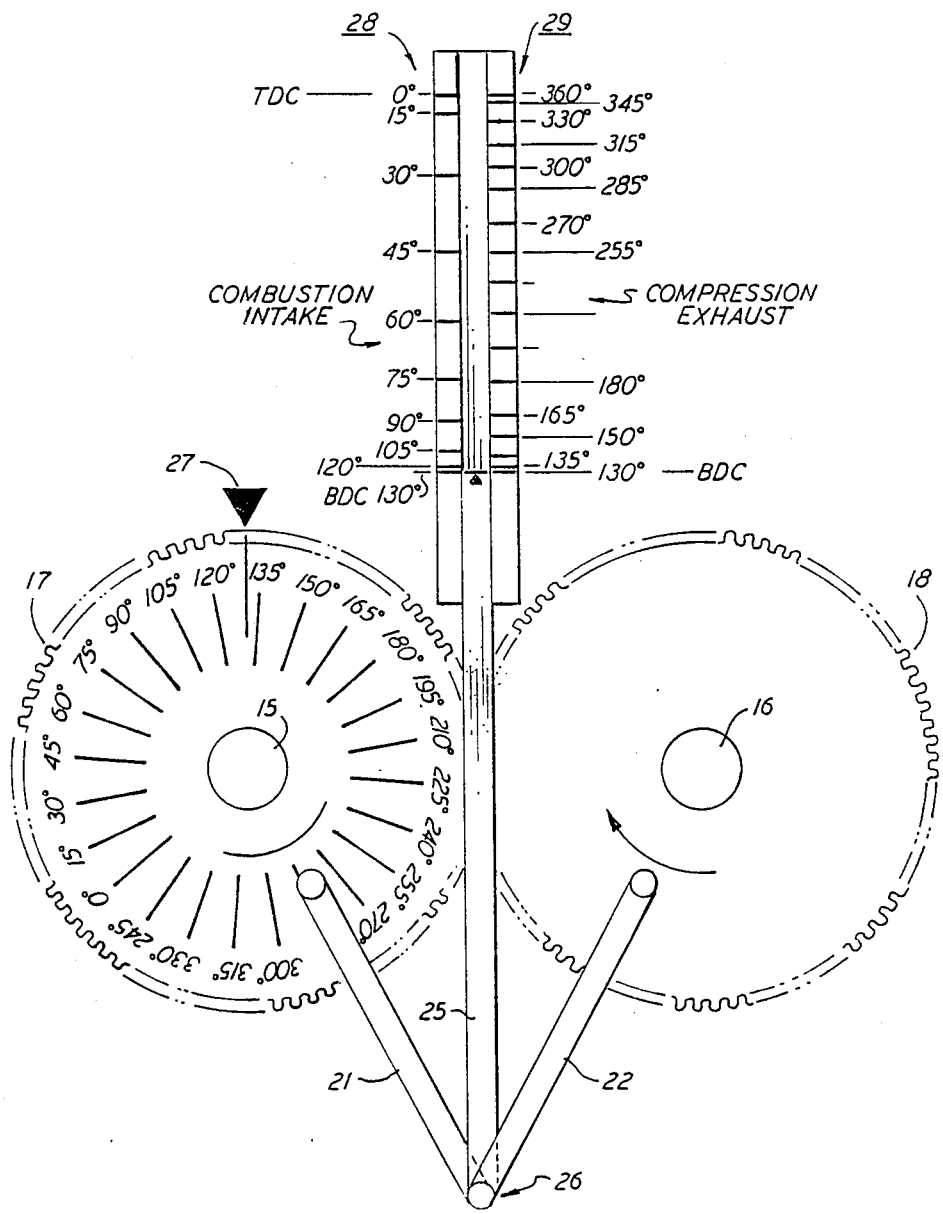
FIG. 4 is another chart for explaining the operation of this invention.

FIG. 4 graphically illustrates the mechanical advantage relationship of this invention between the crank motion thereof and the piston travel on compression and power strokes. Here, a timing mark 27 is shown relative to angular orientations of the spur gear 17 and scales 28 and 29 show the relative piston positions during the compression stroke (representing travel from BDC to TDC) and during the power stroke (representing travel from TDC to BDC). It can be seen that the ratio of compression stroke crank travel to power stroke crank travel can be 2:1 or greater.

Figure 5:
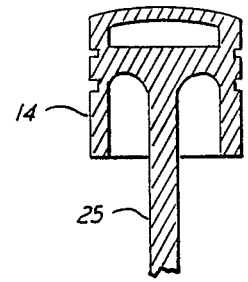
FIG. 5 is a cut-away sectional view of a piston portion of the internal combustion engine of this invention.

Because the piston rod 25 reciprocates along its axis only, and does not rock back and forth, the piston and rod 25 can be unitarily formed, as shown in cross section in FIG. 5, leading to increased strength and stability.

Although the present invention has been described in detail with reference to a single preferred embodiment, it should be understood that the invention is not limited to that precise embodiment. For example, the engine could employ multiple cylinders, rather than only a single cylinder as is illustratively shown. Also, the theory of this invention could be readily applied to a piston type pump or compressor. Thus, many modifications and variations of this embodiment would present themselves to those of skill in the art without departing from the scope and spirit of this invention, as defined in the appended claims.

I claim:

1. In a reciprocating engine of the type in which a piston travels in a cylinder between top dead center and bottom dead center positions, and in which a pair of parallel counter-rotating cranks having crank arms joined by respective connecting rods to said piston and have axes that define a crank plane, such that the rotary motion of the cranks for travel of the piston from the top dead center position to the bottom dead center position is significantly different from 180 degrees, and the rotary motion of the cranks for the travel of the piston from the bottom dead center position to the top dead center position is correspondingly different from 180 degrees in the complementary sense, and wherein the engine further comprises a piston rod that extends from said piston and between the crank axes and is pivotally coupled to said connecting rods such that the pivotal couplings of said piston rod to said connecting rods remains disposed at the side of said crank plane remote from said piston for all travel of said piston between said top dead center and bottom dead center positions; the improvement wherein the piston travel from top dead center to bottom dead center corresponds to crank motion significantly greater than 180 degrees and the piston travel from bottom dead center to top dead center corresponds to crank motion significantly greater that 180 degrees; and the crank arms, the connecting rods, and separation of the cranks are related such that for a given rotation angle of said cranks near top dead center, said piston descends from top dead center substantially at least twice as far as said piston ascends toward top dead center, whereby dwell time at top dead center is significantly reduced.

2. A reciprocating engine as in claim 1 in which the travel from top dead center to bottom dead center and the travel from bottom dead center to top dead center respectively correspond to crank motion of substantially 130° and 230°.

3. A reciprocating engine as in claim 1 in which the travel from bottom dead center to top dead center and the travel from top dead center to bottom dead center respectively correspond to rotary angles that are of the order of at least substantially 2:1.

4. A reciprocating engine as in claim 1 in which said piston rod is rigidly mounted on said piston.

5. A reciprocating engine as in claim 4 in which said piston rod and said piston are unitarily formed.

6. A reciprocating engine as in claim 1 wherein said engine has a compression stroke occurring from the bottom dead center to the top dead center position and a power stroke from the top dead center to the bottom dead center position.

7. A reciprocating engine as in claim 6 in which the engine has a crank rotation angle over the compression stroke that is substantially double the crank rotation angle over the power stroke.

8. A reciprocating engine as in claim 1 in which said counter-rotating cranks rotate in respective crank circles, and the direction of rotation is such that the travel from bottom dead center to top dead center corresponds to rotation of the cranks on the inner parts of the crank circles.

9. In a reciprocating engine of the type in which a piston travels in a cylinder between top dead center and bottom dead center positions, and in which a pair of parallel counter-rotating cranks are joined by respective connecting rods to said pistons and have axes that define a crank plane, such that the rotary motion of the cranks for travel of the piston from the top dead center to the bottom dead center position is significantly less that 180 degrees and the rotary motion of the cranks for travel of the piston from the bottom dead center to the top dead center position is correspondingly greater than 180 degrees; the improvement wherein the engine comprises a piston rod that extends from said piston and between the crank axes and is pivotally coupled to said connecting rods so that the pivotal couplings of said piston rod to said connecting rods remains disposed at the side of the crank plane remote from said piston for all travel of said piston between said top dead center and bottom dead center positions, and said piston descends, towards bottom dead center, immediately after top dead center substantially at least twice as far as said piston ascends toward top dead center, such that dwell time at top dead center is significantly reduced.

* * * * *